United States Patent
Sugita et al.

[11] Patent Number: 6,023,551
[45] Date of Patent: Feb. 8, 2000

[54] INFORMATION SIGNAL REPRODUCTION CONTROL SYSTEM

[75] Inventors: Takehiro Sugita, Kanagawa; Akira Ogino, Chiba; Takashi Usui, Tokyo, all of Japan

[73] Assignee: Sony Corporation, Tokyo, Japan

[21] Appl. No.: 08/971,396

[22] Filed: Nov. 12, 1997

[30]     Foreign Application Priority Data

Nov. 18, 1996  [JP]  Japan ................................. P08-322329

[51] Int. Cl.[7] ...................................................... H04N 5/91
[52] U.S. Cl. ................................................ 386/94; 386/95
[58] Field of Search .................................. 386/94, 95, 46, 386/1; 380/3, 4, 5, 9, 10; 360/15, 60; H04N 5/91

[56]             References Cited

U.S. PATENT DOCUMENTS 3,984,624  10/1976  Waggener .
5,319,735  6/1994  Preuss et al. ............................ 395/2.14
5,673,357  9/1997  Shima ......................................... 386/94

FOREIGN PATENT DOCUMENTS 0360615  3/1990  European Pat. Off. .
0400906  12/1990  European Pat. Off. .
0574892  12/1993  European Pat. Off. .

*Primary Examiner*—Robert Chevalier
*Attorney, Agent, or Firm*—Jay H. Maioli

[57]             ABSTRACT

A synthetic information signal generated by superimposing one spreading code selected out of predetermined plural spectrum spreading codes different in a phase or a code series on a main information signal is output according to a reproduction control signal for controlling the prohibition and the allowance of recording the above main information signal on a recording medium, a reproduction control signal according to the result of detecting the spreading code in the synthetic signal is generated and the main information signal is recorded on the recording medium according to the reproduction control signal.

3 Claims, 18 Drawing Sheets

REPRODUCTION PREVENTION CONTROL SIGNAL
SPECTRUM BEFORE SPECTRUM IS SPREAD

REPRODUCTION PREVENTION CONTROL SIGNAL
SPECTRUM AFTER SPECTRUM IS SPREAD

SPECTRUM OF VIDEO SIGNAL ON WHICH SS REPRODUCTION
PREVENTION CONTROL SIGNAL IS SUPERIMPOSED

SIGNAL SPECTRUM AFTER SPECTRUM IS
REDUCED ON SIDE OF RECORDER

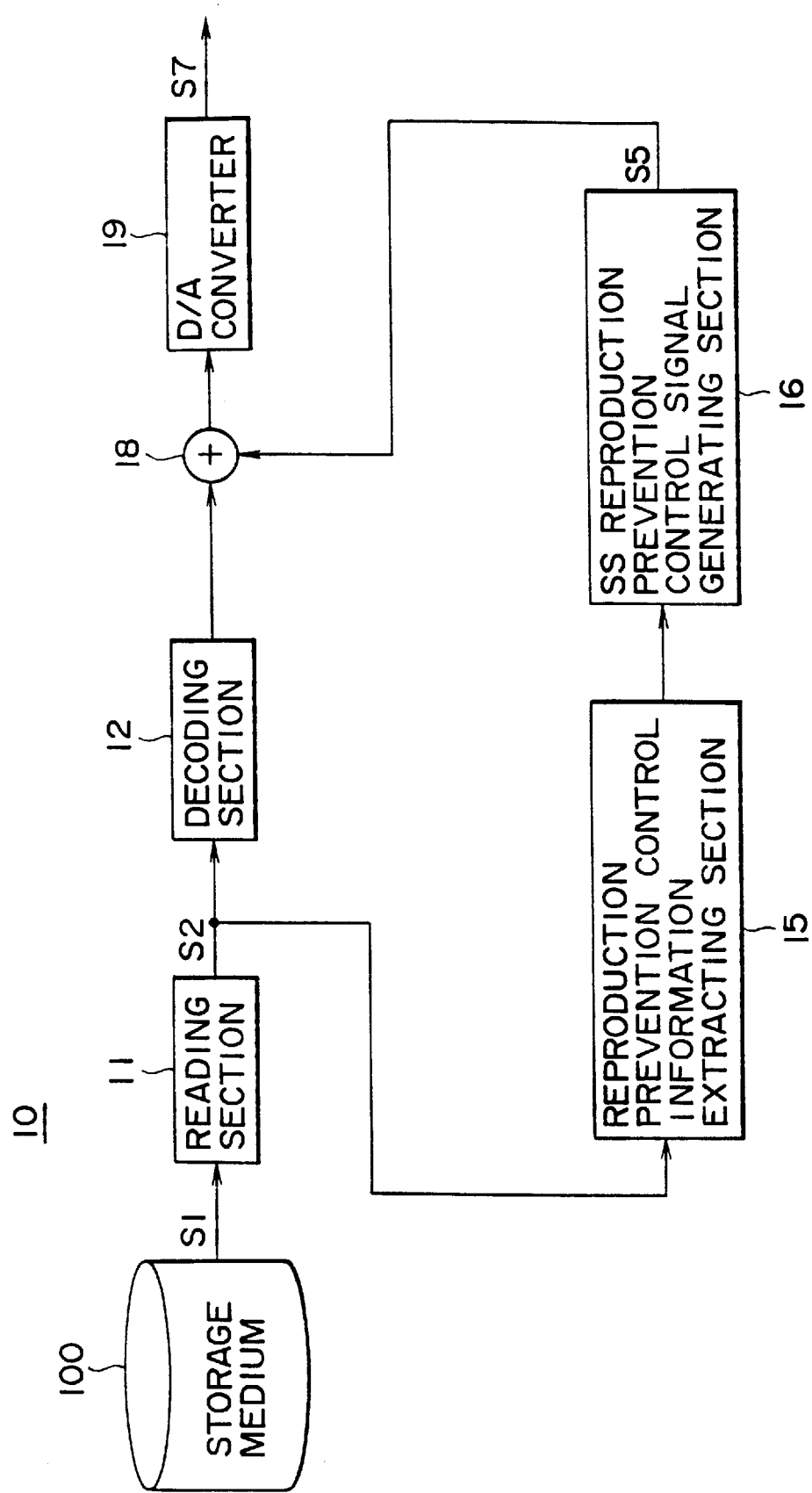

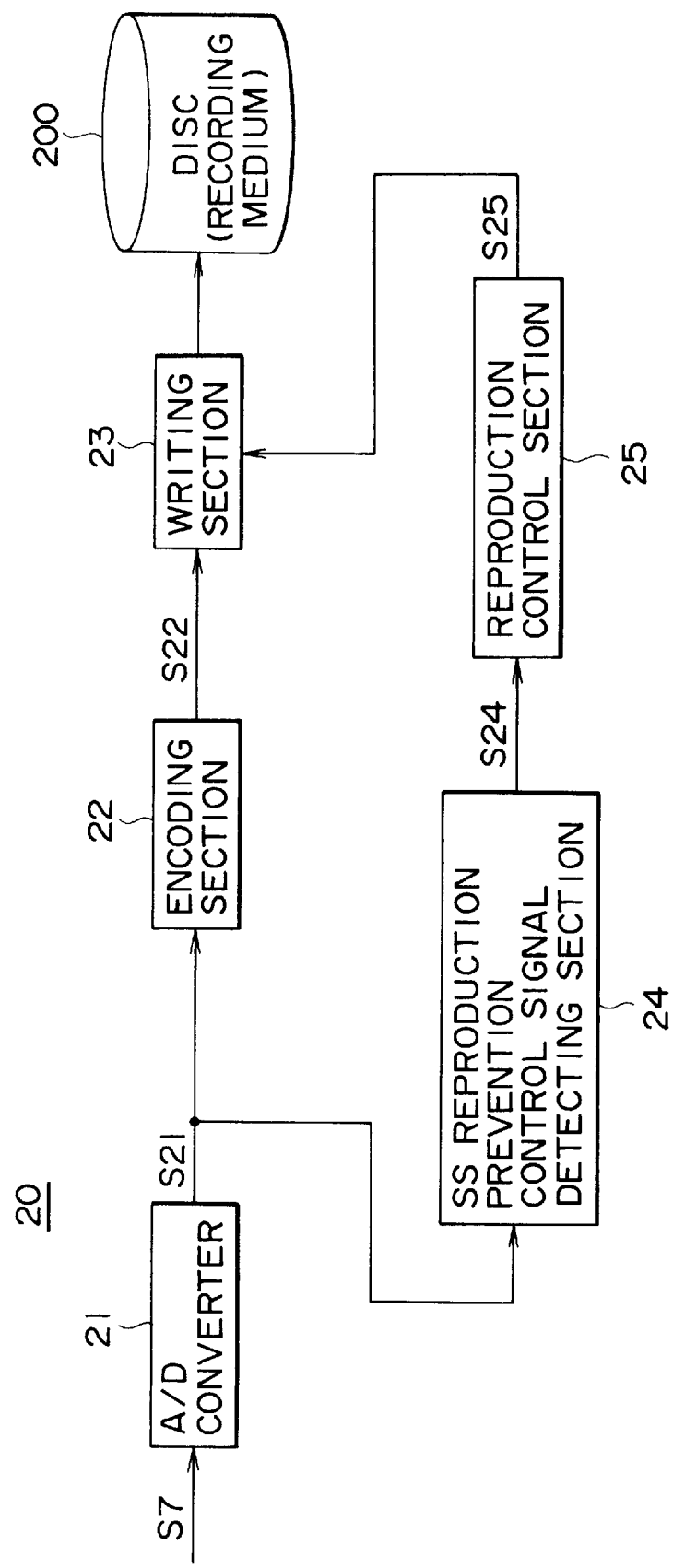

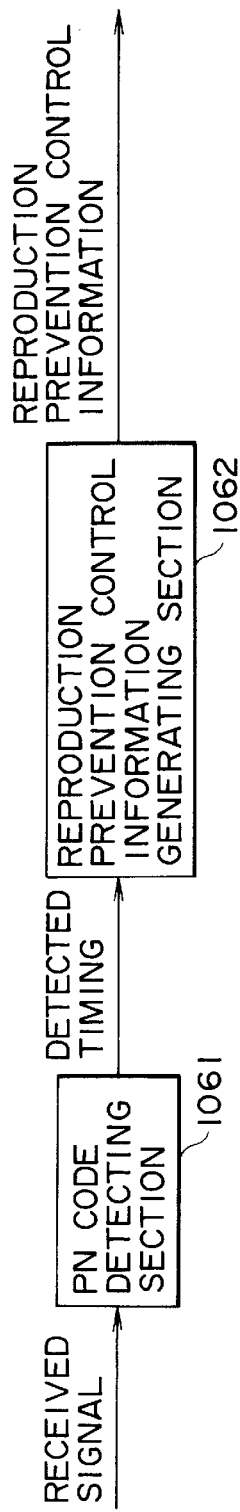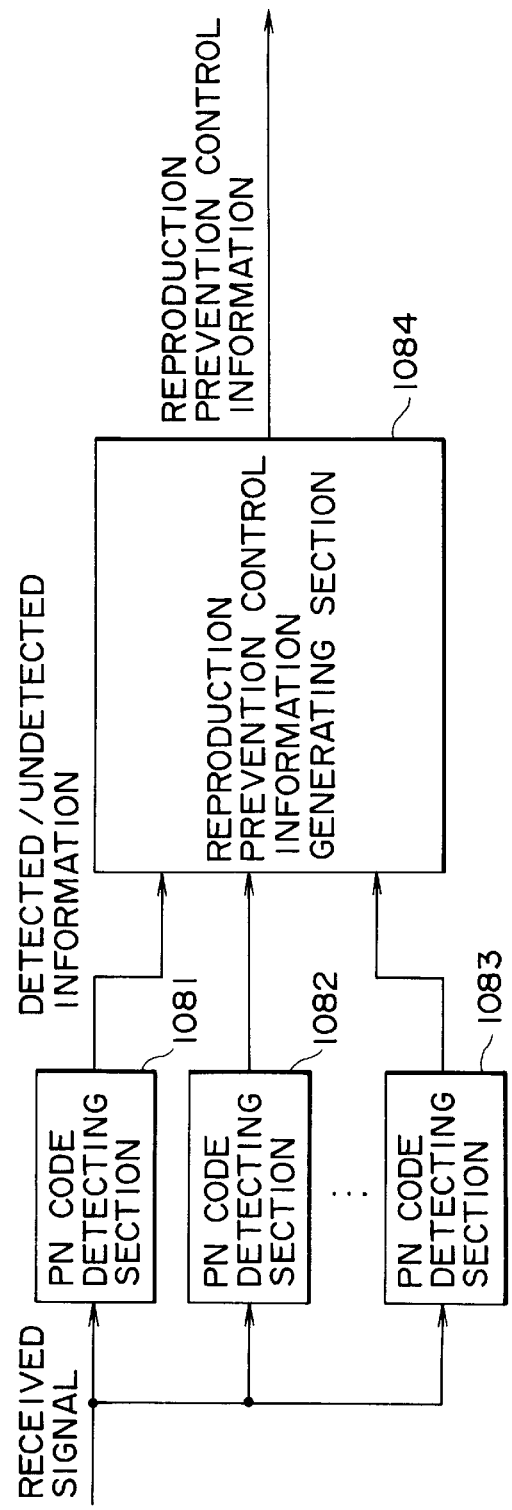

INFORMATION SIGNAL REPRODUCTION CONTROL SYSTEM

BACKGROUND OF THE INVENTION

1. Field of the Invention

The present invention relates to a method and a system for limiting or prohibiting reproducing an information signal recorded on a recording medium for example, for transmitting the analog information signal together with information for preventing reproduction, for receiving the transmitted information signal and recording it on another recording medium and an information output device used for the system.

2. Description of the Related Art

A video tape recorder (VTR) has been popularized and a large number of software reproducible by VTR is provided. Also, recently, a digital VTR, a reproducer for a digital video disc (DVD) and others have been realized, and an image excellent in image quality and tone quality and voice can be easily reproduced and can be seen and heard.

However, there is a problem that software provided as described above may be reproduced unlimitedly and various measures for preventing reproduction have been heretofore taken.

For example, there is a method of substantially preventing reproduction, utilizing difference in an automatic gain control (AGC) method between VTR for example as a recorder and a monitor picture tube for providing an image or difference in the characteristics of automatic phase control (APC) between them though the above method is not a method of directly prohibiting the reproduction of an analog video signal.

That is, for example, VTR adopts the ACC method in which a pseudo synchronizing signal inserted into a video signal is used and a monitor picture tube adopts the AGC method in which a pseudo synchronizing signal is not used. In the method of preventing reproduction by utilizing the difference in the AGC method, when an analog video signal is recorded on an original recording medium, a pseudo synchronizing signal the level of which is extremely high as a synchronizing signal for AGC is inserted and the above pseudo synchronizing signal the level of which is extremely high is inserted into a video signal supplied from VTR for reproduction to VTR for recording as a synchronizing signal for AGC.

Also, VTR adopts an APC method of using the phase of a color burst in a video signal and a monitor picture tube adopts an APC method which is different from the above APC method. In a method for preventing reproduction by utilizing difference in the characteristics of APC, when an analog video signal is recorded on an original recording medium, the phase of a color burst in the video signal is partly inverted and a video signal the phase of a color burst of which is partly inverted is output as a video signal supplied from VTR for reproduction to VTR for recording.

In the above case, in a monitor picture tube to which an analog video signal from VTR for reproduction is supplied, an image is normally reproduced without being influenced by a pseudo synchronizing signal and the inversion of the partial phase of a color burst is used for APC.

However, in VTR to which an analog video signal into which a pseudo synchronizing signal from VTR for reproduction is inserted as described above is supplied or an analog video signal the phase of a color burst of which is inverted is supplied and recorded on a recording medium, gain control based upon an input signal or phase control cannot be normally executed and a video signal cannot be normally recorded. Therefore, even if a recorded video signal is reproduced, a normal visible and audible image cannot be reproduced.

In case an analog video signal is dealt as described above, a normal visible and audible reproduced image is prevented from being obtained in place of prohibiting reproduction and the method is so-called passive reproduction prevention control.

In the meantime, in case digitized information, for example a video signal is dealt, direct reproduction prevention control such as prohibiting reproduction is executed by adding a reproduction prevention code or a reproduction prevention control signal consisting of a reproduced generation limitation code and others as digital data to a video signal and recording it on a recording medium.

FIG. 1 is a basic block diagram showing a reproducing and recording system in case the above digitized information is dealt. A digital information signal reproduced by a digital information reproducer 110 is sent to a digital information recorder 120 via a digital information transmission line 101, if the digital information signal may be reproduced, reproduction is executed and if reproduction is not allowed, reproduction is prohibited.

Reproduction prevention control information as added information is recorded in addition to digital main information on a recording medium 111 installed in the digital information reproducer 110. This reproduction prevention control information includes the prohibition and allowance of reproduction, the limitation of a generation and others as its control contents. A digital information reproducing section 112 reads an information signal from the recording medium 111, obtains reproduction prevention control information together with digital main information and sends them to the digital information recorder 120 via the digital information transmission line 101.

The reproduction prevention control signal detecting section 122 of the digital information recorder 120 detects a reproduction prevention control signal from an information signal received via the digital information transmission line 101 and judges its control contents. The reproduction prevention control signal detecting section 122 sends the result of the judgment to the digital information recording section 121.

The digital information recording section 121 converts an input digital signal to digital information suitable for recording when the result of judging the reproduction prevention control signal from the reproduction prevention control signal detecting section 122 shows that the recording of digital information input via the digital information transmission line 101 is allowed and writes the converted digital information to a recording medium 123. In the meantime, when the result of the judgment of a reproduction prevention control signal sent from the reproduction prevention control signal detecting section 122 shows that reproduction is prohibited, the digital information recording section 121 does not write input digital information to the recording medium.

Further, when the result of the judgment of a reproduction prevention control signal sent from the reproduction prevention control signal detecting section 122 shows that only the reproduction of a first generation is allowed, the digital information recording section 121 converts the above input digital signal to digital information suitable for recording, writes it to the recording medium 123, changes the reproduction prevention control signal from added information to the one which shows the prohibition of reproducing the next generation and records the changed reproduction prevention control signal on the recording medium 123. Therefore, a video signal cannot be reproduced using the reproduced recording medium 123.

If a main information signal and a reproduction prevention control signal as added information are supplied to a recorder as a digital signal as described above, in other words, in the case of digital connection, reproduction prevention control such as the prohibition of reproduction can be securely executed using a reproduction prevention control signal in the recorder.

If the digital information reproducer shown in FIG. 1 is a digital VTR for example, only a video signal and an aural signal respectively as a main information signal are converted to an analog signal via a D/A converter circuit 113 so as to monitor the reproduced video signal and aural signal and are normally supplied to a monitor picture tube via an analog output terminal 114.

Even if the reproducer is the one for digital information as described above, a reproduction prevention control signal is not included in an analog signal supplied from the analog output terminal 114. Therefore, in the case of analog connection in which an analog VTR and others are connected to the analog output terminal 114, an information signal can be reproduced.

Accordingly, it is conceivable that a reproduction prevention control signal is superimposed on a video signal and an aural signal respectively converted from digital to analog, however, it is difficult to add a reproduction prevention control signal without deteriorating the video signal and the aural signal respectively converted from digital to analog, to extract the reproduction prevention control signal from a recorder and use it for reproduction prevention control.

Therefore, in the case of analog connection, there was only a method of passively preventing reproduction using a reproduction preventing method utilizing difference in an AGC method between the above VTR and a monitor picture tube or difference in the characteristics of APC.

However, in the case of the reproduction prevention control method utilizing difference in the AGC method between the above VTR and a monitor picture tube or difference in the characteristics of APC, a video signal is normally recorded depending upon an AGC method or the characteristics of APC on the side of a recorder and a case that even passive reproduction prevention cannot be executed occurs. There may occur a problem that an image reproduced on a monitor picture tube is out of order.

SUMMARY OF THE INVENTION

The object of the present invention is to enable superimposing reproduction prevention control information on an analog information signal and transmitting it to a recorder without deteriorating the quality of the reproduced analog information signal in place of the above passive reproduction prevention measure even if a signal input to the recorder for reproduction is an analog signal.

The present invention relates to an information signal reproduction control system for outputting a synthetic information signal generated by superimposing a reproduction control signal on a main information signal and recording the above main information on a recording medium according to the above reproduction control signal in the synthetic information signal. The above information signal reproduction control system is provided with spreading code output means for selectively outputting one of predetermined plural different spectrum spreading codes according to a reproduction control signal for controlling the prohibition and the allowance of recording a main information signal on a recording medium, superimposing means for superimposing the selected spectrum spreading code on the above main information signal and generating a synthetic information signal, spreading code detecting means for detecting the spreading code included in the above synthetic information signal from the superimposing means and outputting a detected result signal, reproduction control signal generating means for generating a reproduction control signal for controlling the prohibition and the allowance of recording the above main information signal on the recording medium according to the above detected result signal supplied from the spreading code detecting means and recording means for recording the main information signal on the recording medium according to the above reproduction control signal.

According to the present invention, a spreading code can be used as reproduction prevention control information by using the PN codes of different phases or a code generated by combining an orthogonal code and a PN code for spectral spreading for generating reproduction prevention control information to be superimposed.

BRIEF DESCRIPTION OF THE DRAWINGS

FIG. 6 is a block diagram for explaining another example of the embodiment of the information output device shown in FIG. 2 according to the present invention;

FIG. 7 is a block diagram for explaining an embodiment of an information recorder according to the present invention;

FIG. 17 is a block diagram showing a fifth example of the SS reproduction prevention control signal detecting section used for the information recorder according to the present invention; and FIG. 18 is a block diagram showing a sixth example of the SS reproduction prevention control signal detecting section used for the information recorder according to the present invention.

DESCRIPTION OF THE PREFERRED EMBODIMENTS

Figure 1:
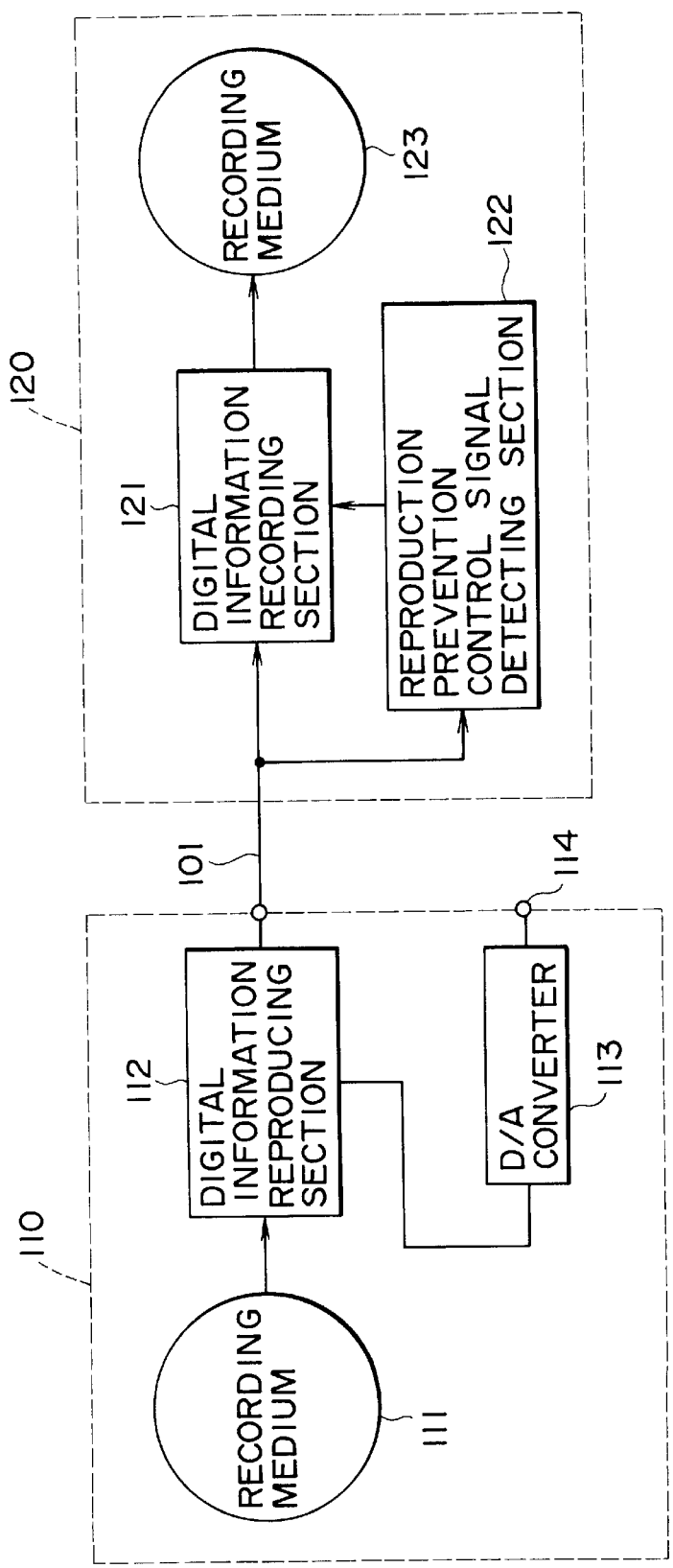
FIG. 1 is a block diagram for explaining the conventional type constitution of a reproduction prevention control system.

Referring to the drawings, the embodiments of the present invention will be described below.

An information reproduction prevention system formed by an information output device and a recorder to which the present invention is respectively applied will be described below. In detail, the above system will be described, assuming that the information output device and the recorder are applied to an apparatus (hereinafter called a DVD apparatus) for recording and reproducing information on/from a digital video disc (DVD). However, to simplify the description, the description of an aural signal is omitted.

First Embodiment

Figure 2:
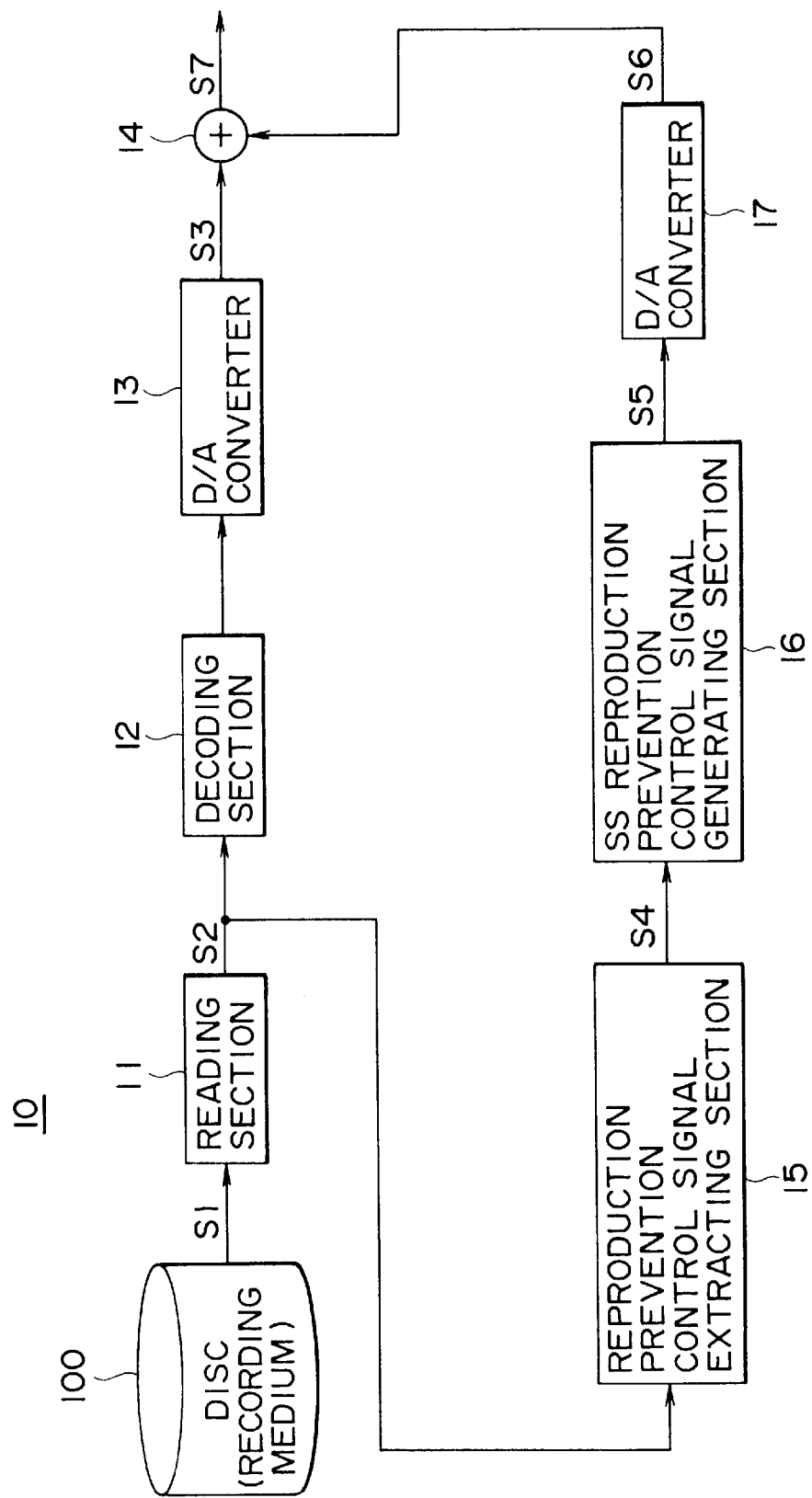
FIG. 2 is a block diagram for explaining an embodiment of an information output device according to the present invention.

FIG. 2 explains an information output device 10 in a first embodiment. That is, the information output device 10 is an apparatus for reproducing DVD.

Digitized video signal, aural signal and a reproduction prevention control signal as added information are recorded on a disc 100 shown in FIG. 2. A reproduction prevention control signal can be recorded in a table of contents (TOC) in the innermost of the disc 100 or in a track area called a directory and can be also inserted into a different recording area in a track where video data and voice data are recorded. An example described below shows the case of the latter and a case in which a reproduction prevention control signal is also simultaneously read when video data is read.

A reproduction prevention control signal is an information signal showing the prohibition or the allowance of reproducing a video signal or the limitation of a generation and is inserted into video data. The disc 100 is installed in the information output device 10 and a recorded signal is read in response to a reading request.

As shown in FIG. 2, the information output device 10 is provided with a reading section 11, a decoding section 12, a D/A converter 13, an adding section 14, a reproduction prevention control signal extracting section 15, an SS (the abbreviation of spectrum spread) reproduction prevention control signal generating section 16 and a D/A converter 17.

The reading section 11 extracts a digital reproduced video signal element S2 from a signal S1 obtained by reproducing an information signal recorded on the disc 100 and supplies it to the decoding section 12 and the reproduction prevention control signal extracting section 15.

The decoding section 12 decodes the digital reproduced video signal element S2 and supplies the decoded video signal to the D/A converter 13. The D/A converter 13 converts the decoded video signal to an analog video signal S3 including a vertical synchronizing pulse and a horizontal synchronizing pulse and supplies the analog video signal S3 to the adding section 14.

The reproduction prevention control signal extracting section 15 extracts a reproduction prevention control signal S4 from the information data string of the reproduced video signal element S2 extracted by the reading section 11 and supplies it to the SS reproduction prevention control signal generating section 16.

The SS reproduction prevention control signal generating section 16 generates a pseudo-random noise (PN) code string and spreads the spectrum of the reproduction prevention control signal S4 using the PN code string.

Figure 3:
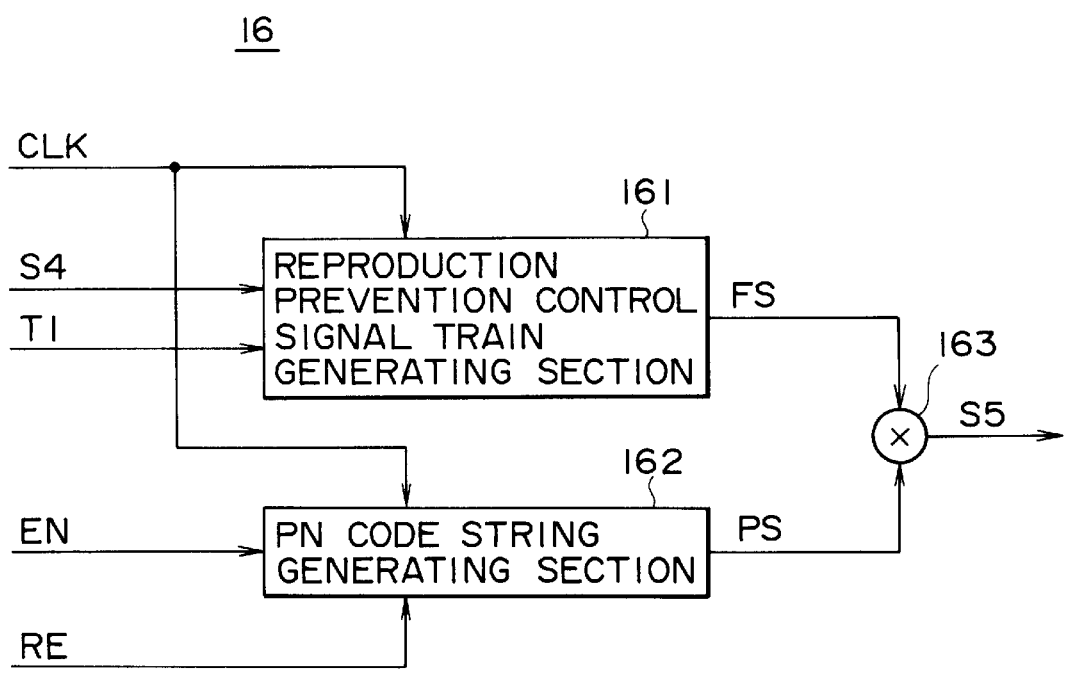
FIG. 3 is a block diagram for explaining an SS reproduction prevention control signal generating section in the embodiment shown in FIG. 2.

FIG. 3 shows an example of the constitution of the SS reproduction prevention control signal generating section 16. As shown in FIG. 3, the SS reproduction prevention control signal generating section 16 is provided with a reproduction prevention control signal sequence generating section 161, a PN code string generating section 162 and a multiplier 163.

A clock pulse CLK, the reproduction prevention control signal S4 from the reproduction prevention control signal extracting section 15 and a timing pulse T1 are supplied to the reproduction prevention control signal sequence generating section 161. In this case, the timing pulse T1 shows the timing of a break for every bit of the reproduction prevention control signal S4. The clock pulse CLK is synchronized with a reproduced digital signal.

The reproduction prevention control signal sequence generating section 161 generates a reproduction prevention control signal sequence FS by outputting the reproduction prevention control signal S4 according to a predetermined number of clocks for every bit and supplies it to the multiplier 163. In the case of the above example, for example, the reproduction prevention control signal sequence generating section generates one- or two-bit reproduction prevention control signal sequence FS showing the prohibition and the allowance of reproduction for every interval of one vertical cycle.

The clock pulse CLK, an enabling signal EN and an initialization signal (a reset pulse) RE are supplied to the PN code string generating section 162. An enabling signal EN is generated by powering on the information output device 10 for example.

The PN code string generating section 162 is activated according to an enabling signal EN. The PN code string generating section 162 generates a PN code string PS from the head every time in which the reset pulse RE is supplied in synchronization with the clock pulse CLK. The generated PN code string PS is supplied to the multiplier 163.

Figure 4:
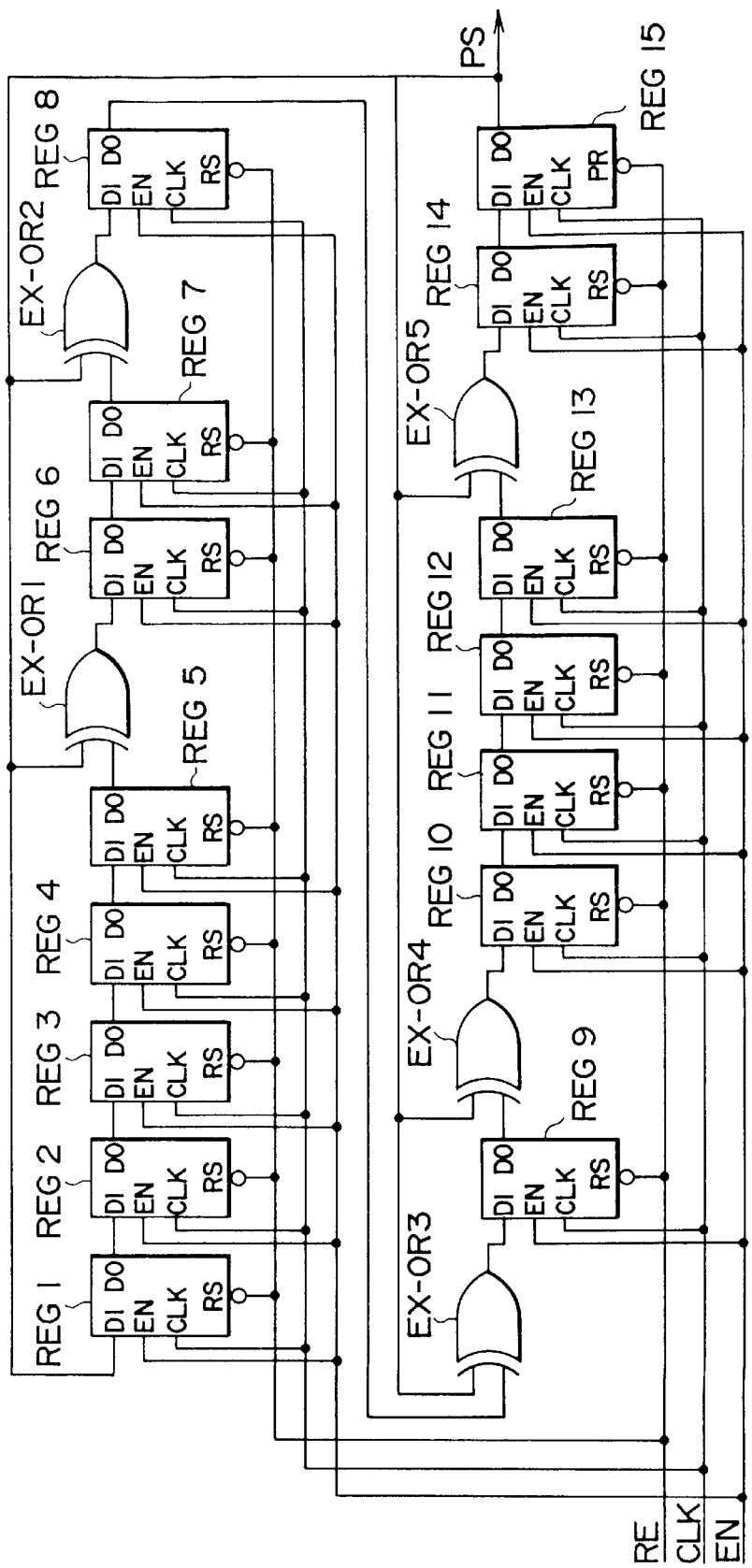
FIG. 4 is a block diagram for explaining an example of a PN code string generating section which is a part of the section shown in FIG. 3.

FIG. 4 shows an example of the constitution of the PN code string generating section 162. The PN code string generating section 162 in this case consists of fifteen D flip-flops REG1 to REG15 constituting 15 shift registers and exclusive-OR circuits EX-OR1 to EX-OR 5 for operating the suitable tap output of these shift registers. The PN code string generating section 162 shown in FIG. 3 generates an M-series PN code string PS according to the reset pulse RE, the clock pulse CLK and an enabling signal EN as described above.

The multiplier 163 spreads the spectrum of a reproduction prevention control signal sequence FS using a PN code string PS from the PN code string generating section 162. A spectrum spread signal S5 (hereinafter called an SS reproduction prevention control signal) which is a reproduction prevention control signal the spectrum of which is spread is obtained from the multiplier 163.

As described above, the SS reproduction prevention control signal S5 obtained from the SS reproduction prevention control signal generating section 16 is supplied to the D/A converter 17, is converted to an analog SS reproduction prevention control signal S6 there and is supplied to the adding section 14.

The adding section 14 receives the analog video signal S3 from the D/A converter 13 and the analog SS reproduction prevention control signal S6 from the D/A converter 17, generates an analog video signal S7 generated by superimposing the analog SS reproduction prevention control signal S6 and outputs it. The analog video signal S7 in which the analog SS reproduction prevention control signal S6 is superimposed is supplied to a monitor picture tube for displaying an image, a recorder for recording a video signal on a recording medium and others.

Figure 5A:
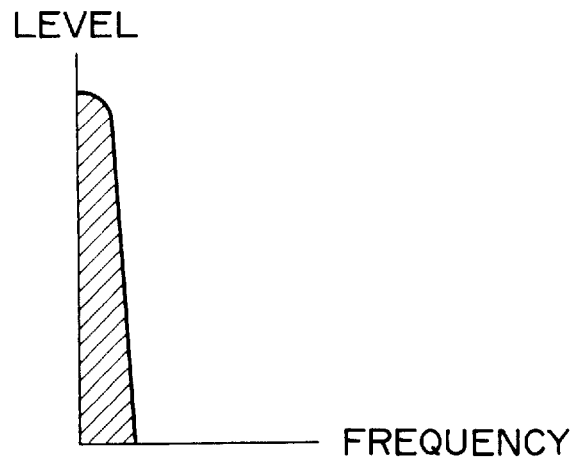
FIGS. 5A to 5D show the relationship between an SS reproduction prevention control signal and an information signal by a spectrum.
Figure 5B:
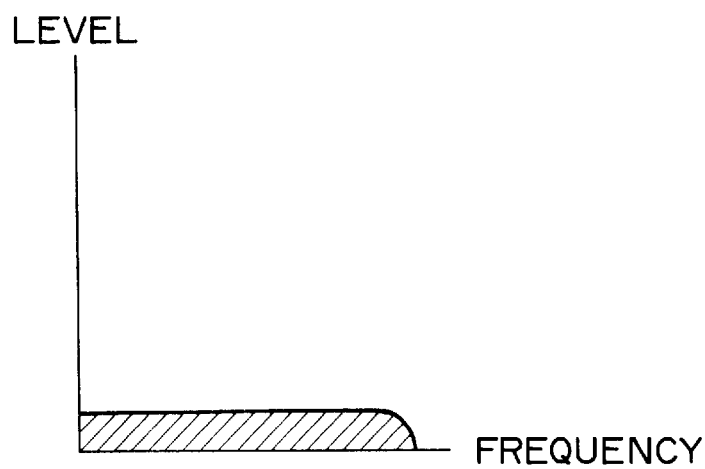

FIGS. 5A to 5D show the relationship between a reproduction prevention control signal and a video signal as an information signal by a spectrum. A reproduction prevention control signal is a slow signal in a bit rate the quantity of information of which is small and is a narrow-band signal as shown in FIG. 5A. When the spectrum of the above signal is spread, the signal is changed to a broad-band signal as shown in FIG. 5B. At this time, the level of a spectrum spread signal is lowered in inverse proportion to the ratio of the amplification of a band.

Figure 5C:
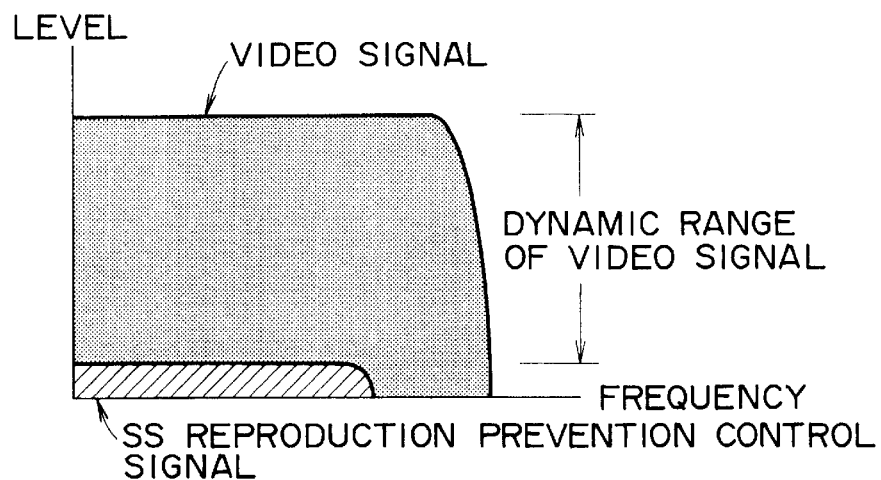

In case the above spectrum spread signal, that is, the SS reproduction prevention control signal S6 is superimposed on a video signal by the adding section 14, the SS reproduction prevention control signal S6 is superimposed at a lower level than the dynamic range of the video signal as shown in FIG. 5C. A video signal can be mostly prevented from being deteriorated by superimposing an SS reproduction prevention control signal as described above. Therefore, in case a video signal on which an SS reproduction prevention control signal is superimposed is supplied to a monitor picture tube and an image is reproduced, the image is hardly influenced by the SS reproduction prevention control signal and a satisfactory reproduced image can be obtained.

Figure 5D:
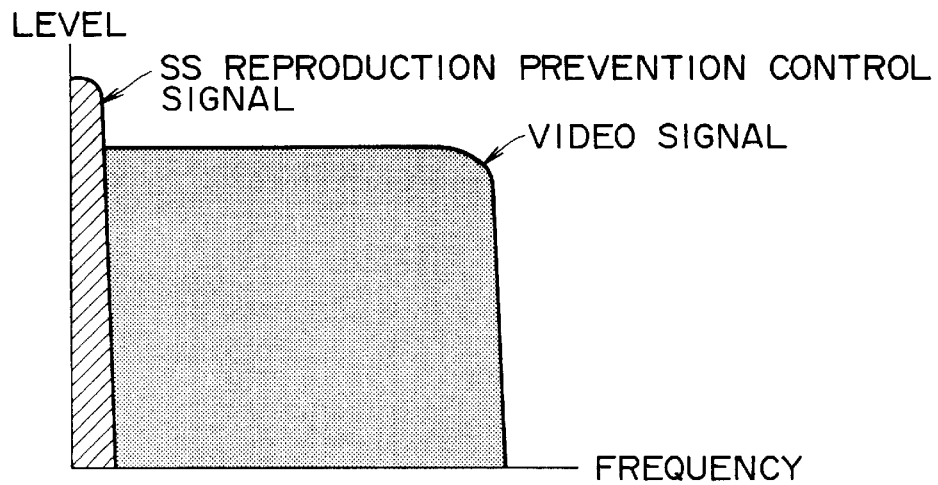

However, as described later, when a spectrum is reduced to detect an SS reproduction prevention control signal on the side of a recorder, the SS reproduction prevention control signal is restored as a narrow-band signal again as shown in FIG. 5D. The power of the spectrum reduced reproduction prevention control signal is more than that of an information signal and the above reproduction prevention control signal can be detected by providing a sufficient band spread coefficient.

In this case, as the SS reproduction prevention control signal S6 superimposed on an analog video signal is superimposed for the same time and at the same frequency as the analog video signal, it cannot be deleted and corrected by a frequency filter and the simple substitution of information. Therefore, an SS reproduction prevention control signal superimposed on a video signal is never removed and can be securely provided to a monitor picture tube, a recorder and others.

In FIG. 2, after a decoded video signal is converted to the analog signal, the SS reproduction prevention control signal S6 converted by a D/A converter 17 is superimposed on the above analog video signal. However, the information output device 10 can be also constituted as shown in FIG. 6. That is, as shown in FIG. 6, a digital video signal from the decoding section 12 and the digital SS reproduction prevention control signal S5 from the SS reproduction prevention control signal generating section 16 are added by the digital information adding section 18. The analog video signal S7 on which an SS reproduction prevention control signal is superimposed is obtained by converting the output from the adding section 18 to an analog signal by a D/A converter 19. The other components of the information output device 10 are the same as in FIG. 2.

Next, a recorder for recording information when an output signal from the above information output device 10 is supplied will be described.

FIG. 7 shows an example of the constitution of an example of a recorder 20 used for the information reproduction prevention system in this embodiment. The recorder 20 is an apparatus for recording on DVD.

The recorder 20 is provided with an A/D converter 21, an encoding section 22, a writing section 23, an SS reproduction prevention control signal detecting section 24 and a reproduction control section 25 for controlling the allowance/the prohibition of reproduction as shown in FIG. 7. A disc 200 is DVD to which a video signal is written by the recorder 20.

The analog video signal S7 supplied from the information output device 10 to the recorder 20 is converted from analog to digital by the A/D converter circuit 21 and supplied to the encoding section 22 and the SS reproduction prevention control signal detecting section 24 as a digital video signal S21.

The encoding section 22 generates a digital video signal S22 for recording by removing a video synchronizing pulse and executing encoding processing such as compressing the digital video signal when the encoding section receives the digital video signal S21 and supplies it to the writing section 23.

The SS reproduction prevention control signal detecting section 24 reduces the spectrum of the digital video signal and fetches a reproduction prevention control signal superimposed on the digital video signal S21.

Figure 8:
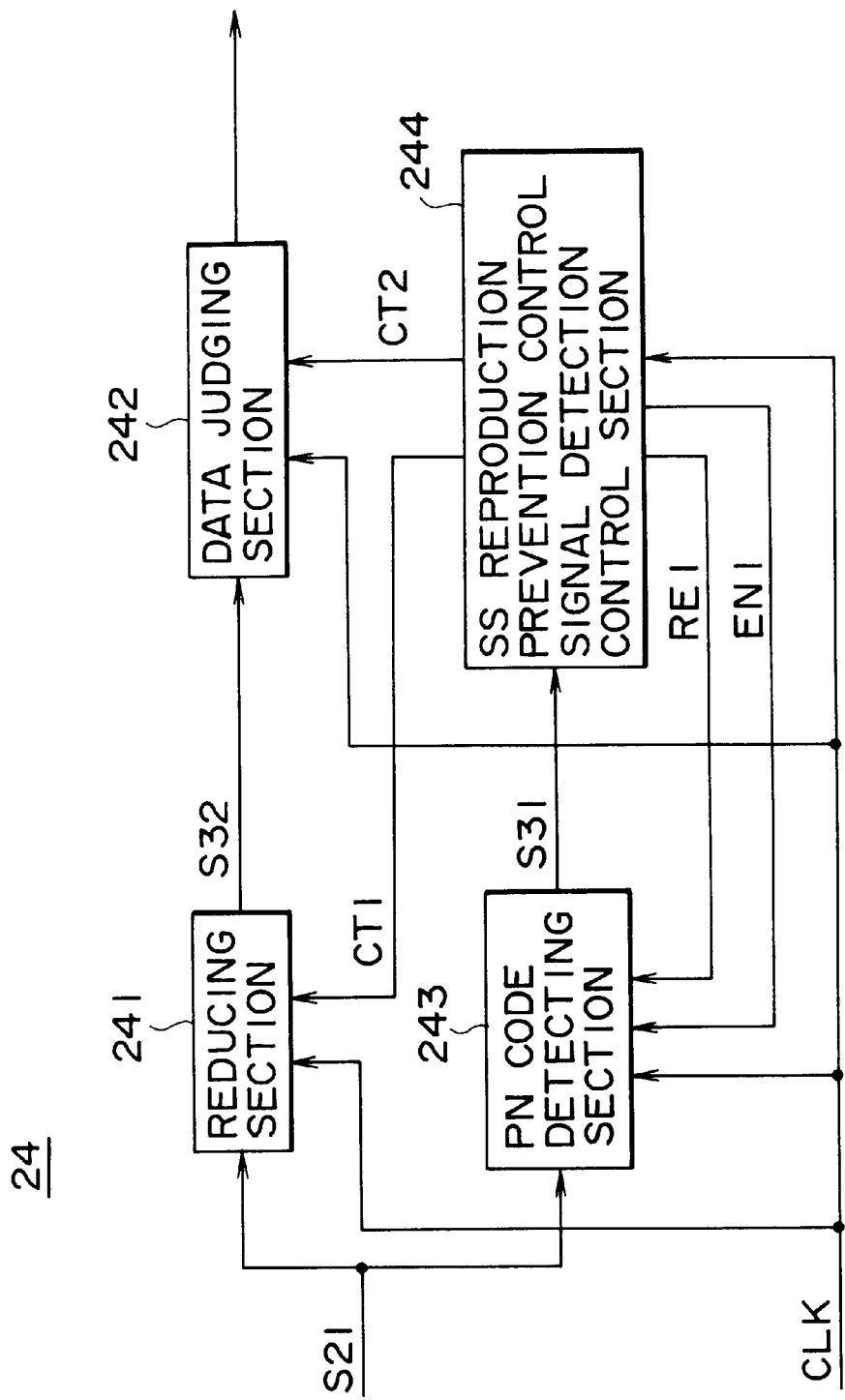
FIG. 8 is a block diagram showing an example of an SS reproduction prevention control signal detecting section in the embodiment shown in FIG. 7.

FIG. 8 is a block diagram for explaining the constitution of the SS reproduction prevention control signal detecting section 24 of the recorder 20. As shown in FIG. 8, the SS reproduction prevention control signal detecting section 23 in this embodiment is provided with a reducing section 241 for fetching a spectrum spread reproduction prevention control signal from the supplied digital signal S21, a data judging section 242 for restoring the reproduction prevention control signal fetched by the reducing section 241 to the original reproduction prevention control signal, a PN code detecting section 243 for detecting a PN code for spreading the spectrum of the reproduction prevention control signal and an SS reproduction prevention control signal detection control section 244.

As shown in FIG. 8, the SS reproduction prevention control signal detection control section 244 generates an enabling signal EN1 and a reset pulse RE1 according to the clock pulse CLK, supplies these to the PN code detecting section 243 and controls processing for detecting a PN code for spreading the spectrum of a reproduction prevention control signal.

The PN code detecting section 243 is constituted by a sliding correlator for example. The PN code detecting section 243 is activated by an enabling signal EN1. The PN code detecting section generates a PN code string every timing according to the reset pulse RE1 according to the clock pulse CLK.

The PN code detecting section 243 detects a PN code string for spreading the spectrum of a reproduction prevention control signal by acquiring the degree of a correlation between the generated PN code string and a PN code string for spreading the spectrum of a reproduction prevention control signal.

The PN code detecting section 243 supplies a signal S31 showing the result of acquiring the degree of the correlation between the generated PN code string and the PN code string for spreading the spectrum of the reproduction prevention control signal to the SS reproduction prevention control signal detecting section 244. The signal S31 is a high-level signal if the degree of the correlation detected by the PN code detecting section 243 as described above is high and a low-level signal if the degree of the correlation is low.

The SS reproduction prevention control signal detection control section 244 judges that a PN code string for spreading the spectrum of a reproduction prevention control signal and the PN code string generated by the PN code detecting section 243 are synchronous when the signal S31 showing the degree of the correlation sent from the PN code detecting section 243 is a signal of a higher level than a predetermined level, that is, that the PN code string for spreading the spectrum of a reproduction prevention control signal is detected. On the contrary, if the signal S31 from the PN code detecting section 243 is at a lower level than a predetermined level, the SS reproduction prevention control signal detection control section 244 judges that a PN code string for spreading the spectrum of a reproduction prevention control signal and the PN code string generated by the PN code detecting section are not synchronous.

When a PN code string for spreading the spectrum of a reproduction prevention control signal is not detected by the PN code detecting section 243, the PN code detecting section 243 adjusts the phase of a PN code string generated by the section under control by the reset pulse RE1 sent from the SS reproduction prevention control signal detection control section 244, executes the operation of the above correlation and repeats processing for detecting a PN code string.

When a PN code string for spreading the spectrum of a reproduction prevention control signal is detected by the PN code detecting section 243, the SS reproduction prevention control signal detection control section 244 generates a control signal CT1 for controlling the start timing of the generation of a PN code string for reducing a spectrum according to the result of detection by the PN code detecting section 243 and supplies the signal CT1 to the reducing section 241. The SS reproduction prevention control signal detection control section 244 also generates a signal CT2 for controlling the data judging section 242 and supplies the signal to the data judging section 242.

The reducing section 241 is provided with a PN code generator and a multiplying circuit respectively not shown. The reducing section 241 generates a PN code string every timing provided by the signal CT1 from the SS reproduction prevention control signal detection control section 244 according to the clock pulse CLK. The reducing section 241 reduces a spectrum using the generated PN code string and extracts a reproduction prevention control signal changed to a broad-band and low-level signal like the original narrow-band and high-level signal from the digital video signal S21. The extracted reproduction prevention control signal S32 is supplied to the data judging section 242.

The data judging section 242 restores the extracted reproduction prevention control signal S32 and supplies it to the reproduction control section 25. That is, the data judging section 242 judges the contents of reproduction control specified by the reproduction prevention control signal S32 and supplies the judgment result signal S24 to the reproduction control section 25.

The PN code detecting section 243 of the SS reproduction prevention control signal detecting section 24 shown in FIG. 8 and the PN code generator for generating a PN code string in the reducing section 241 are constituted like the PN code generator shown in FIG. 4 which is used in the SS reproduction prevention control signal generating section 16 of the above information output device 10.

The reproduction control section 25 generates a control signal S25 for controlling the writing section 23 according to the judgment result signal S24 and supplies it to the writing section 23. The control signal S25 controls the allowance or the prohibition of writing a video signal to the disc 200.

The writing section 23 writes the digital video signal S22 from the encoding section 22 to the disc 200 when the control signal S25 from the reproduction control section 25 shows the allowance of reproduction and does not write the digital video signal S22 to the disc 200 when the control signal S25 shows the prohibition of reproduction.

As described above, in the recorder 20, a reproduction prevention control signal the spectrum of which is spread is superimposed on a supplied analog video signal, the reproduction prevention control signal superimposed on the video signal is detected by reducing the spectrum and control for preventing the reproduction of the supplied video signal is enabled according to the detected reproduction prevention control signal.

In the recorder 20 shown in FIG. 7, after the input signal S7 is converted to the digital signal by the A/D converter 21, the signal is supplied to the SS reproduction prevention control signal detecting section 24, however, an SS reproduction prevention control signal can be also detected from the analog signal S7.

Figure 9:
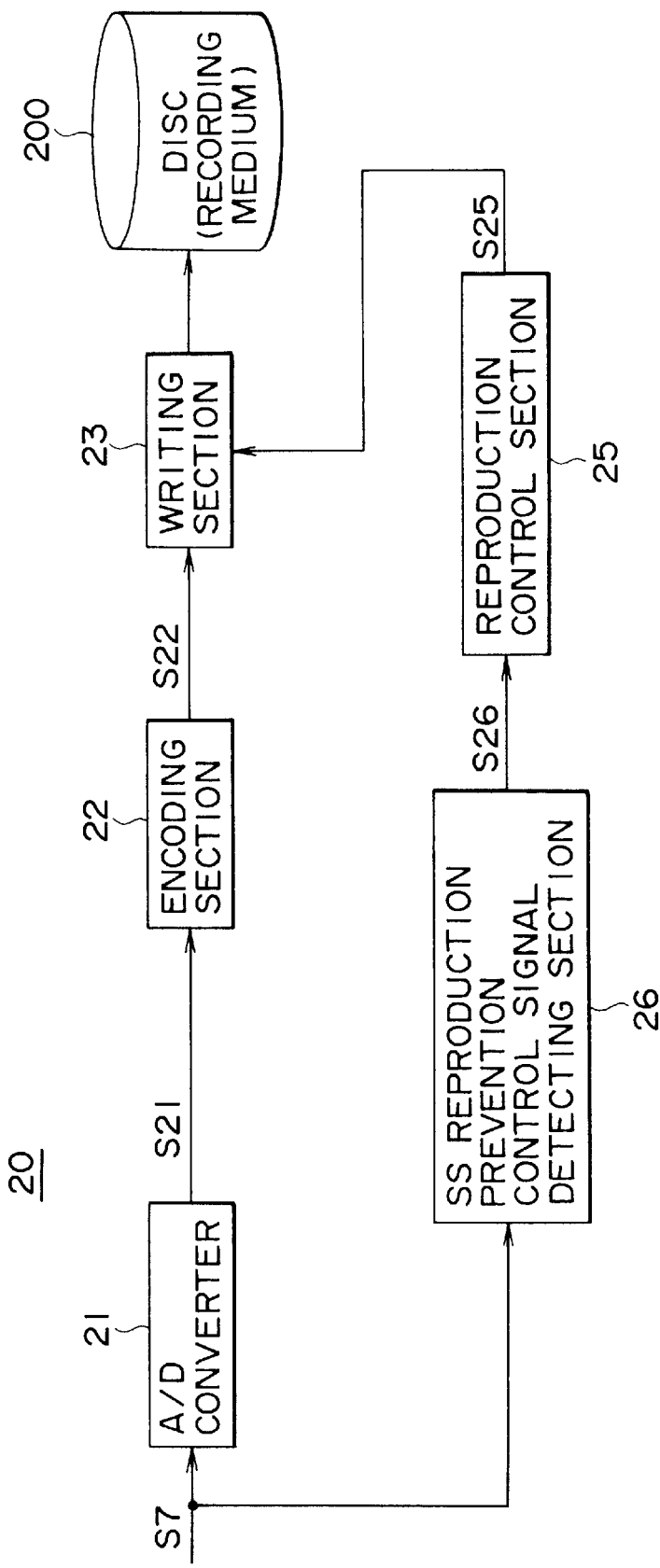
FIG. 9 is a block diagram for explaining another example of the embodiment of the information recorder shown in FIG. 2 according to the present invention.

FIG. 9 shows an example of that case, in which the signal S7 from the information output device 10 is supplied to the A/D converter 21 and is also supplied to the SS reproduction prevention control signal detecting section 26. The SS reproduction prevention control signal detecting section 26 detects a PN code synchronized with an SS reproduction prevention control signal in the signal S7 and restores a reproduction prevention control signal. The SS reproduction prevention control signal detecting section supplies the result of restoration to the reproduction control section 25. The other components of the recorder 20 are the same as in the example shown in FIG. 7.

Second Embodiment

Figure 10:
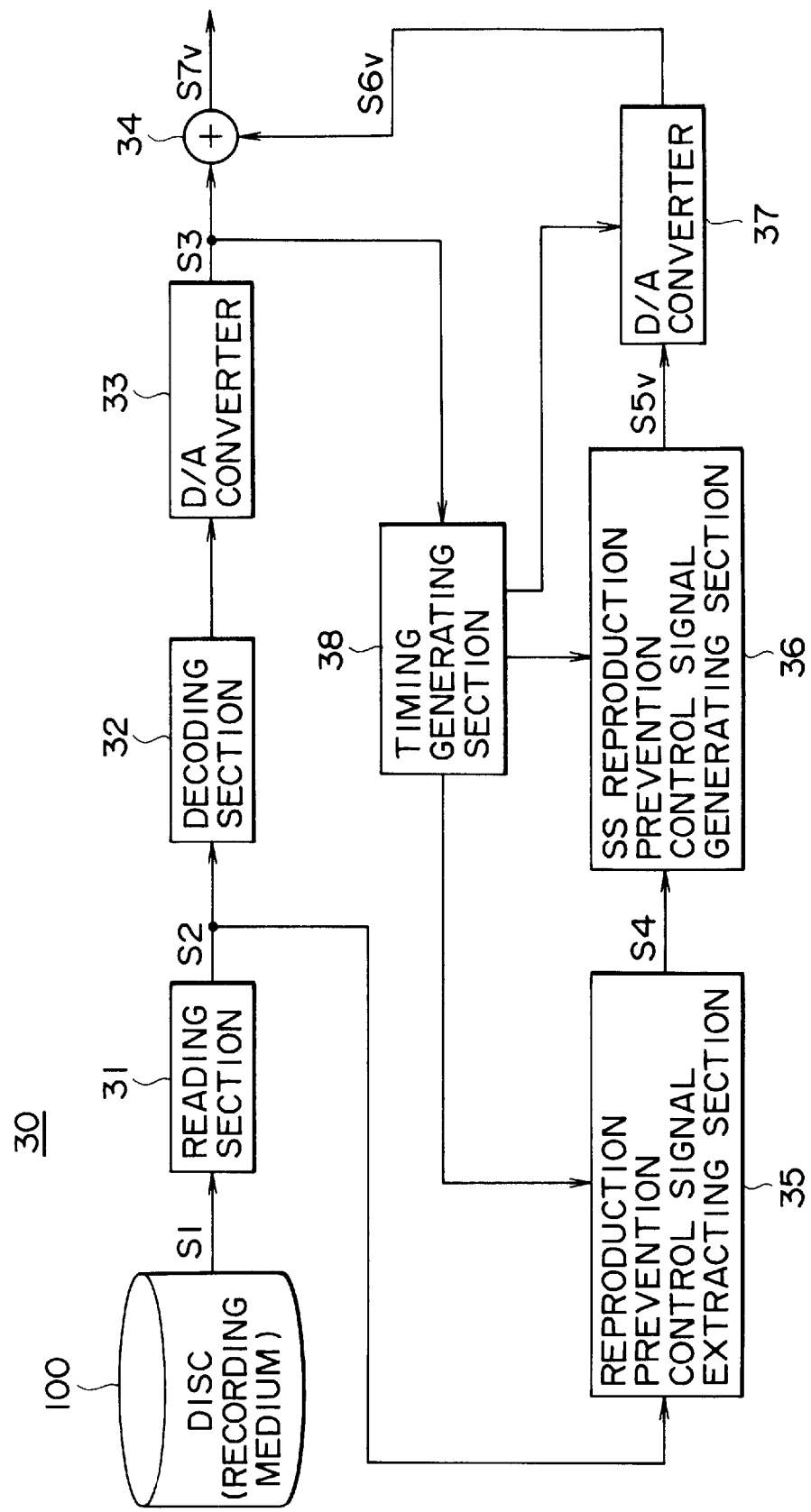
FIG. 10 is a block diagram showing a second embodiment of the information output device according to the present invention.

FIG. 10 shows an example of the constitution of an information output device 30 in a second embodiment. The information output device 30 in this embodiment is an apparatus for reproducing DVD as in the information output device 10 in the above first embodiment.

As shown in FIG. 10, the information output device 30 is provided with a reading section 31, a decoding section 32, a D/A converter 33, an adding section 34, a reproduction prevention control signal extracting section 35, an SS reproduction prevention control signal generating section 36, a D/A converter 37 and a timing generating section 38. Each section except the reproduction prevention control signal extracting section 35, the SS reproduction prevention control signal generating section 36, the D/A converter 37 and the timing generating section 38 is the same as the corresponding section including the disc 100 of the information output device 10 in the first embodiment.

The reproduction prevention control signal extracting section 35, the SS reproduction prevention control signal generating section 36 and the D/A converter 37 of the information output device 30 are provided with the same function as that of the reproduction prevention control signal extracting section 15, the SS reproduction prevention control signal generating section 16 and the D/A converter 17 respectively described referring to FIG. 2 of the information output device 10, however, the above sections are different from the corresponding sections shown in FIG. 2 of the information output device 10 in that the above sections are activated when a timing pulse is supplied from the timing generating section 38.

In the information output device 30, the timing generating section 38 generates a clock pulse and various timing pulses using a video synchronizing pulse in an analog video signal S3 as a reference signal when the analog video signal S3 is supplied from the D/A converter 33.

Figure 11:
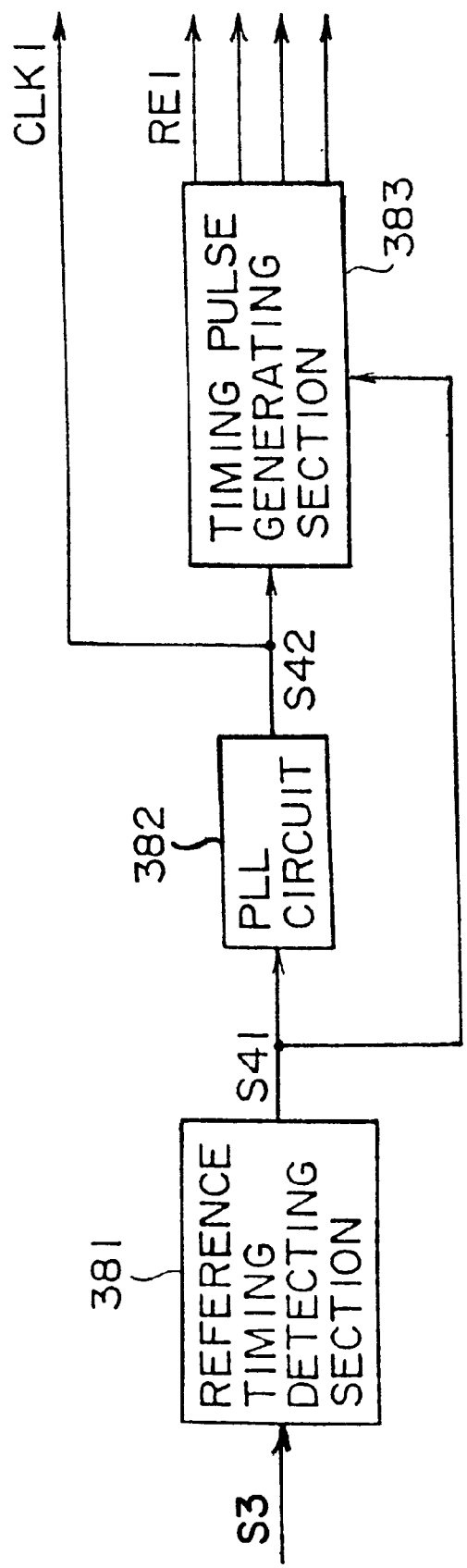
FIG. 11 is a block diagram showing an example of a timing generating section in the embodiment shown in FIG. 10.

FIG. 11 is a block diagram showing an example of the detailed constitution of the timing generating section 38. As shown in FIG. 11, the timing generating section 38 is provided with a reference timing detecting section 381, a PLL circuit 382 and a timing pulse generating section 383.

The reference timing detecting section 381 extracts a video synchronizing pulse as a reference timing pulse from the analog video signal S3 from the D/A converter 33. In this embodiment, as a vertical synchronizing pulse is used for the reference timing pulse, the reference timing detecting section 381 extracts a vertical synchronizing pulse S41 and supplies it to the PLL circuit 382 and the timing pulse generating section 383.

The PLL circuit 382 generates the clock pulse CLK1 synchronized with the vertical synchronizing pulse S41. The clock pulse CLK1 is supplied to the timing pulse generating section 383 and is also supplied to the reproduction prevention control signal extracting section 35, the SS reproduction prevention control signal generating section 36, the D/A converter 37 and others.

The timing pulse generating section 383 generates the reset pulse RE1 and the other various timing pulses according to the vertical synchronizing pulse S41 and the clock pulse CLK1 and outputs them. The reset pulse RE1 is generated as a signal which is synchronized with a vertical synchronizing pulse and one vertical interval of which is set to one cycle.

The reproduction prevention control signal extracting section 35 extracts a reproduction prevention control signal from the information data string of a reproduced video signal element S2 from the reading section 31. The reproduction prevention control signal extracting section 35 supplies the extracted reproduction prevention control signal as a reproduction prevention control signal S4 to the SS reproduction prevention control signal generating section 36 according to the clock pulse CLK1 from the timing generating section 38.

The SS reproduction prevention control signal generating section 36 is provided with a function of spectrum spreading means for spreading the spectrum of the reproduction prevention control signal S4.

In the second embodiment, the SS reproduction prevention control signal generating section 36 is also constituted like the SS reproduction prevention control signal generating section 16 described referring to FIG. 3. However, in the second embodiment, the clock pulse CLK1 synchronized with a video synchronizing pulse from the timing generating section 38 is supplied to the SS reproduction prevention control signal generating section 36, the reset pulse RE1 of a vertical cycle synchronized with the vertical synchronizing pulse S41 is supplied as a reset pulse and an SS reproduction prevention control signal S5v generated by spreading the spectrum of a reproduction prevention control signal by a PN code string reset every vertical cycle and repeated is obtained from the SS reproduction prevention control signal generating section 36.

Figure 12:
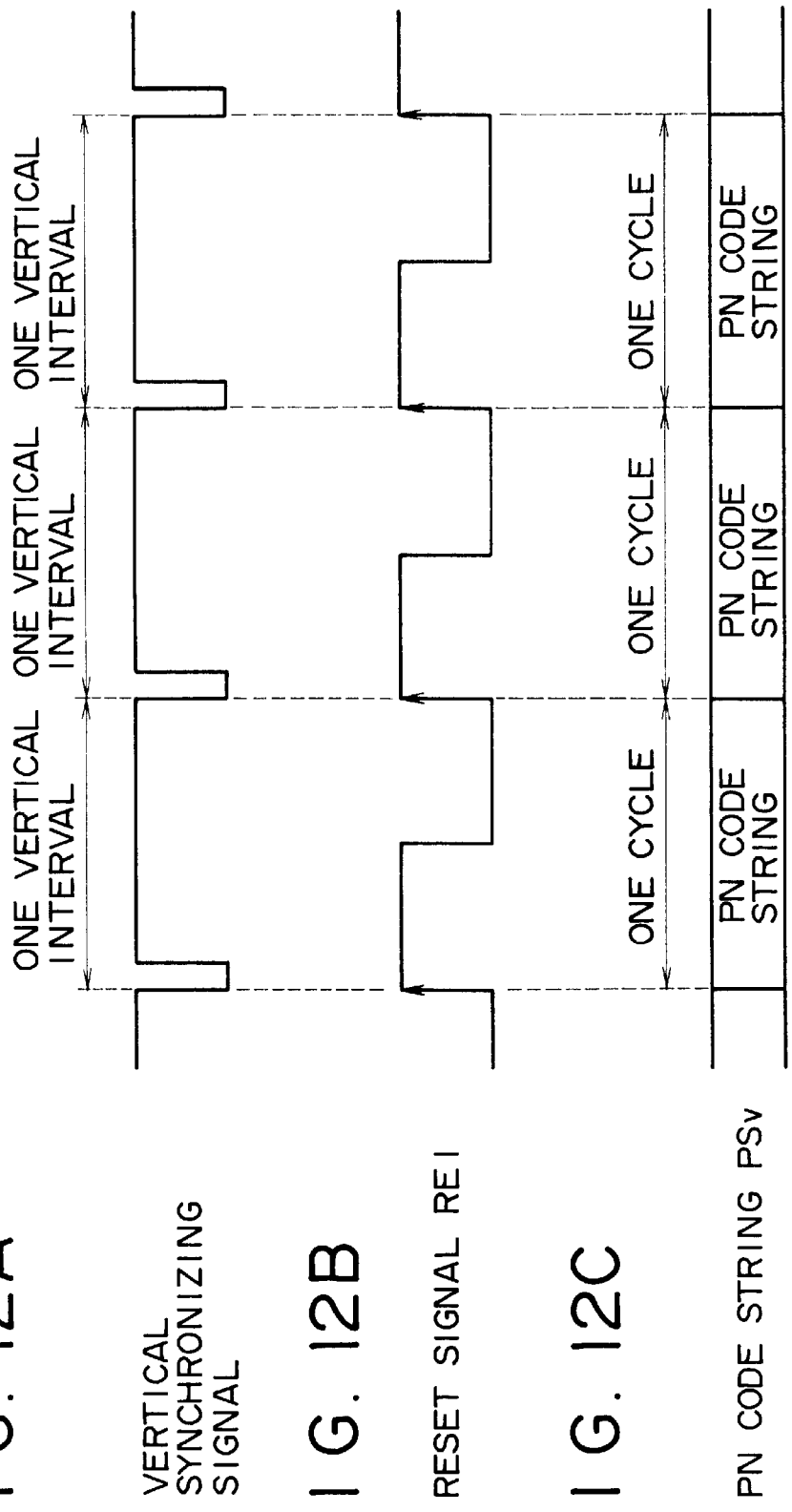
FIGS. 12A to 12C show a timing chart for explaining the principle of a main part in the embodiment shown in FIG. 10.

In the SS reproduction prevention control signal generating section 36, as shown in FIGS. 12A to 12C, a PN code string generating section is initialized every vertical cycle in synchronization with a vertical synchronizing pulse shown in FIG. 12A according to the reset pulse RE1 shown in FIG. 12B one vertical interval of which is set to one cycle and generates a PN code string PSv shown in FIG. 12C one vertical cycle of which is set to a cycle period in synchronization with the clock pulse CLK1. The spectrum of the reproduction prevention control signal S4 is spread by the PN code string PSv and an SS reproduction prevention control signal S5v is generated.

The SS reproduction prevention control signal S5v is converted by the D/A converter 37, an analog SS reproduction prevention control signal S6v is generated and superimposed on the analog video signal S3 and an output video signal S7v is generated. The output video signal S7v is supplied to a monitor picture tube and a recorder.

As for the timing generating section in the above information output device 30, it is described that the timing generating section 38 extracts a vertical synchronizing pulse as a reference signal when the timing generating section receives the analog video signal S3 converted from digital to analog and generates various timing pulses, however, the timing generating section may be also constituted so that it receives a digital video signal before digital-analog conversion, extracts a vertical synchronizing pulse as a reference signal from the digital video signal and generates various timing pulses and a clock pulse.

Next, a recorder for receiving an output signal supplied from the above information output device 30 and recording information will be described.

Figure 13:
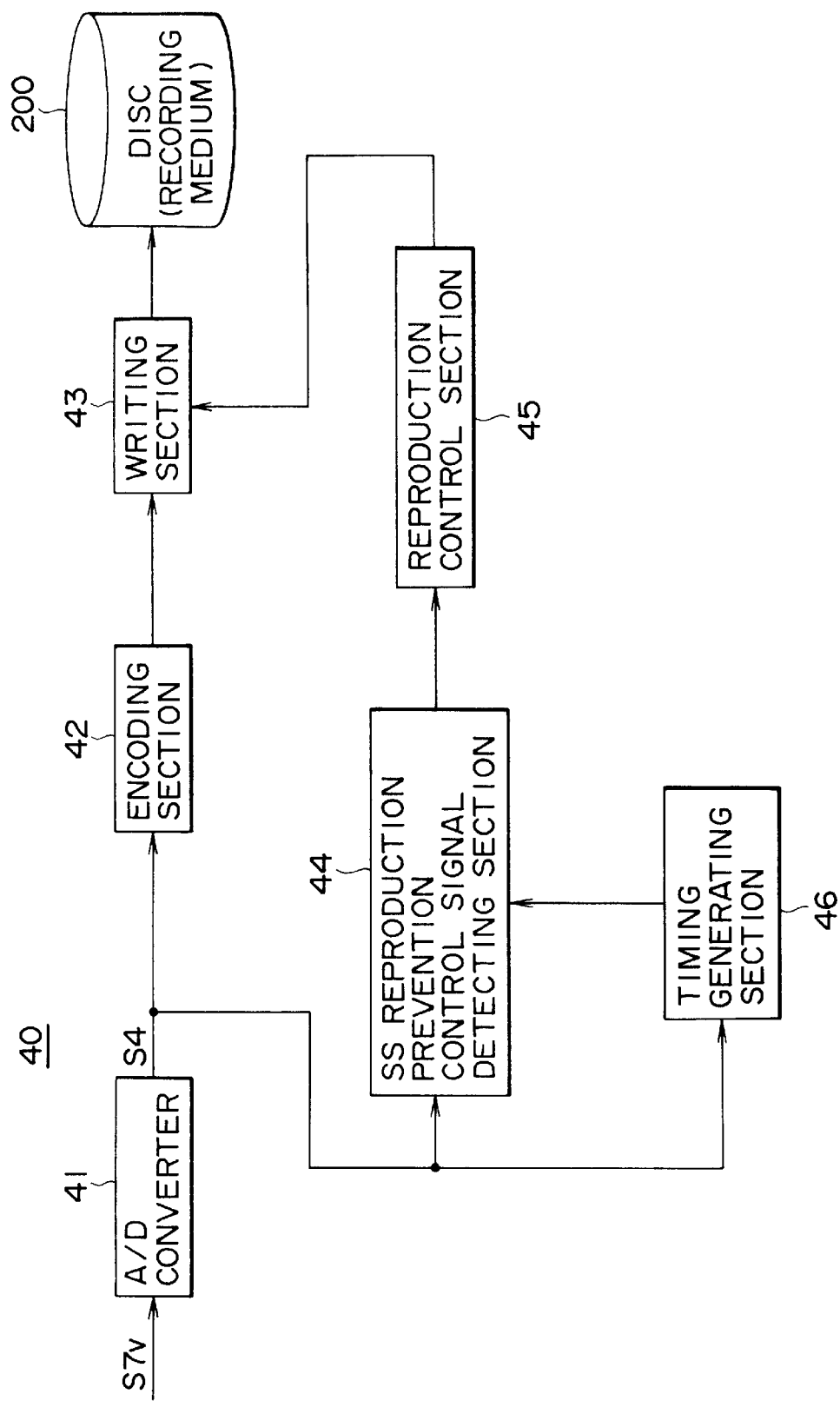
FIG. 13 is a block diagram for explaining a second embodiment of the information recorder according to the present invention.

FIG. 13 explains a recorder 40 used in an information reproduction preventing system equivalent to the second embodiment. The recorder 40 is an apparatus for recording on DVD.

The recorder 40 is provided with an A/D converter 41, an encoding section 42, a writing section 43, an SS reproduction prevention control signal detecting section 44, a reproduction control section 45 for controlling the allowance/the prohibition of reproduction and the timing generating section 46 as shown in FIG. 13. Each section including the disc 200 and except the SS reproduction prevention control signal detecting section 44 and the timing generating section 46 is the same as the corresponding section of the recorder 20 in the first embodiment shown in FIG. 7.

The SS reproduction prevention control signal detecting section 44 of the recorder 40 is provided with a function for reducing a spectrum as in the SS reproduction prevention control signal detecting section 24 of the recorder 20 and as described later, the start timing of the generation of a PN code string for reducing a spectrum is controlled by a reset pulse from the timing generating section 46.

As described above, in the information output device 30, a PN code string PSv is generated according to the reset pulse RE1 which is synchronized with a vertical synchronizing pulse in a video signal and one vertical interval of which is set to one cycle and the spectrum of a reproduction prevention control signal sequence is spread using the PN code string PSv.

Therefore, also in the recorder 40, the PN code string for reducing a spectrum of the same timing as the PN code string PSv for spreading can be readily generated by generating the PN code string for reducing a spectrum every vertical interval according to a vertical synchronizing pulse in a video signal supplied from the information output device 30.

The timing generating section 46 of the recorder 40 is provided with the same constitution as in FIG. 11, generates a clock pulse and a reset pulse for controlling the start timing of the generation of the PN code string for reducing a spectrum according to a vertical synchronizing pulse in the signal S7v input to the recorder 40 and supplies the clock and reset pulses to the SS reproduction prevention control signal detecting section 44.

In this case, a reset pulse obtained from the timing generating section 46 is a pulse corresponding to the reset pulse RE1 used in the SS reproduction prevention control signal generating section 36 of the information output device 30 and is a vertical synchronizing pulse and is a pulse of a vertical cycle. Therefore, the reset pulse obtained from the timing generating section 46 is a pulse synchronized with the reset pulse RE1 and may be a pulse for generating a PN code string for reducing a spectrum from the head. Therefore, in the SS reproduction prevention control signal detecting section 44, the phase control of a PN code for reducing a spectrum using a sliding correlator and others is not required unlike the first embodiment.

The SS reproduction prevention control signal detecting section 44 generates a PN code string for reducing a spectrum according to a timing pulse including a reset pulse from the timing generating section 46 as described above, restores a reproduction prevention control signal superimposed on a digital video signal from the A/D converter 41 by reducing a spectrum using the generated PN code string and supplies it to the reproduction control section 45.

As described above, in the second embodiment, a spectrum is spread or reduced using a PN code string of a vertical cycle based upon a vertical synchronizing pulse. Therefore, in the recorder 40, a reset pulse synchronized with a vertical synchronizing pulse is generated and a PN code string for reducing a spectrum can be readily generated, a spectrum can be promptly reduced, can be promptly spread and a reproduction prevention control signal superimposed on a video signal can be detected.

Also in the recorder 40, the timing generating section 46 receives the digital video signal S41 converted from analog to digital and generates various timing pulses, however, the timing generating section may receive the analog video signal S7v before analog-digital conversion, may extract a vertical synchronizing pulse as a reference signal from the analog video signal S7v and may also generate a timing pulse such as a clock pulse and a reset pulse.

Also in the second embodiment, as described above, a PN code string for spreading and reducing a spectrum is not only generated every vertical interval but may be also generated every plural vertical intervals such as two vertical intervals and four vertical intervals. One vertical interval is divided into plural vertical intervals such as a half vertical interval and a quarter vertical interval and the PN code string may be also generated every divided interval or every plural divided intervals.

A video synchronizing pulse is not limited to a vertical synchronizing pulse and a horizontal synchronizing pulse may be also used. Also in this case, a PN code string for spreading or reducing a spectrum may be also generated every plural horizontal intervals. One horizontal interval is divided into plural horizontal intervals and the PN code string may be also generated every divided interval or every plural divided intervals.

In the above embodiments, the spectrum of one- or two-bit reproduction prevention control signal is spread by one PN code and an SS reproduction prevention control signal is generated, however, as described below, the spectrum of a reproduction prevention control signal is not spread and a PN code itself or the mixture of a PN code and another code may be also transmitted according to the contents of control specified by a reproduction prevention control signal.

Figure 14:
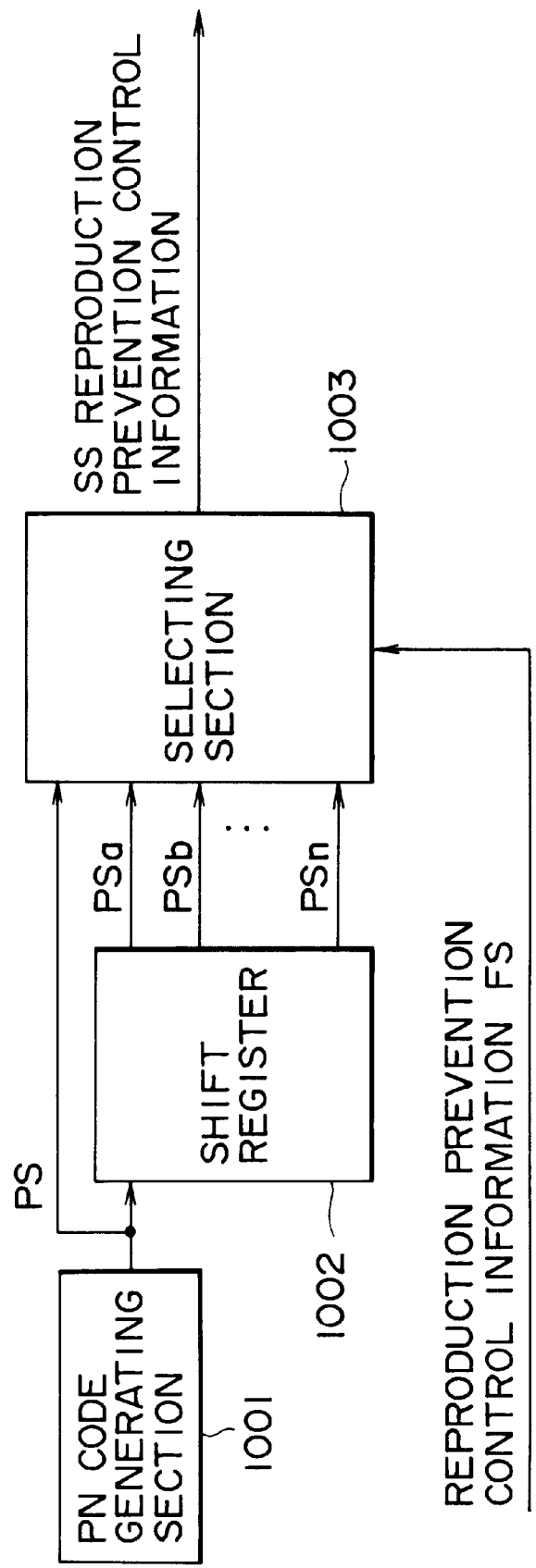
FIG. 14 is a block diagram showing a second example of the SS reproduction prevention control signal generating section used for the information output device according to the present invention.

An example shown in FIG. 14 is an embodiment of an SS reproduction prevention control signal generating section using PN codes different in phase.

In the example, a PN code PS output from a PN code generating section 1001 is supplied to a selecting section 1003 and is also supplied to a shift register 1002. PN codes PSa, PSb, - - - PSn to which the PN code PS is sequentially shifted according to a clock pulse and each phase of which is different are output from the shift register 1002 and are respectively supplied to the selecting section 1003.

A reproduction prevention control signal FS is supplied to the selecting section 1003 as a selected control signal. The selecting section 1003 selects the contents of control in a reproduction prevention control signal which is a selected control signal out of the PN codes PS, PSa, PSb, - - - PSn of plural phases, that is, a PN code of a phase according to the allowance or the prohibition of reproduction and others and outputs it as an SS reproduction prevention control signal.

Figure 15:
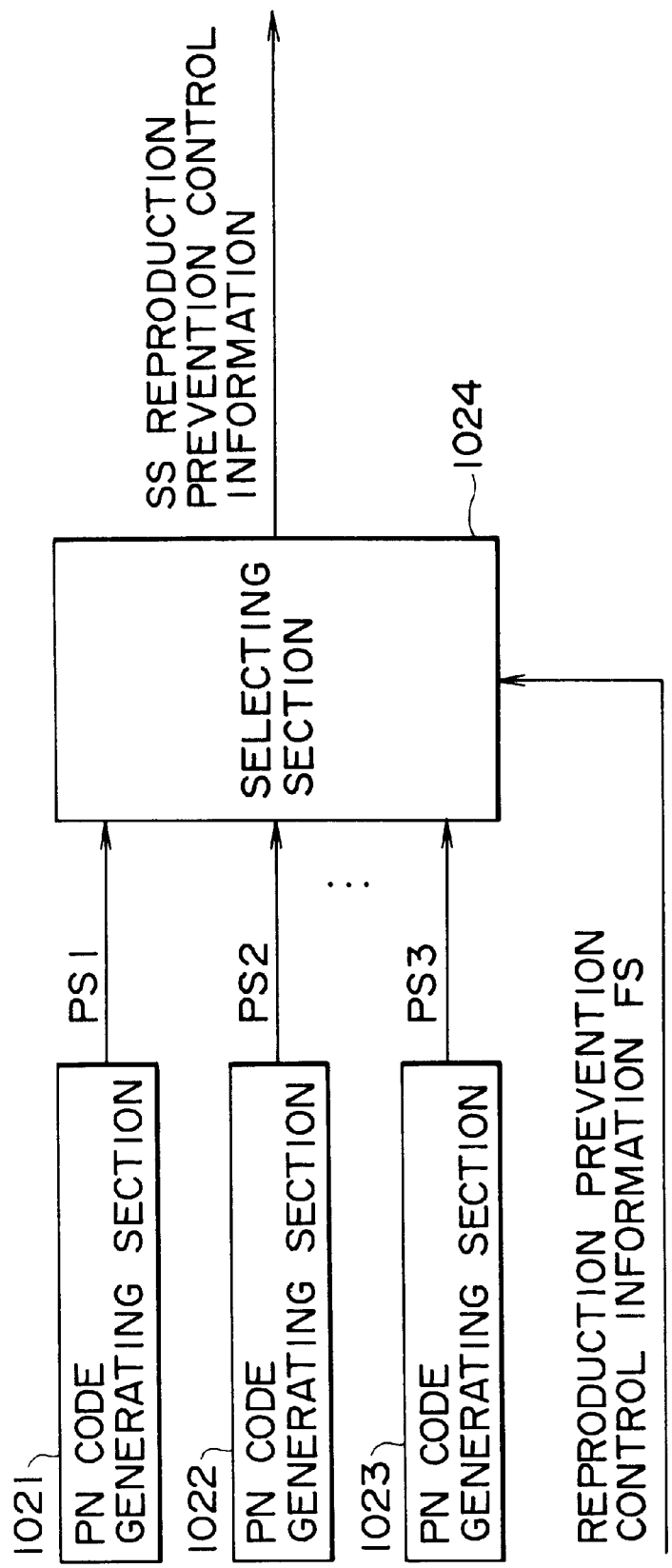
FIG. 15 is a block diagram showing a third example of the SS reproduction prevention control signal generating section used for the information output device according to the present invention.

FIG. 15 shows an embodiment of an SS reproduction prevention control signal generating section in case a different-series PN code is used.

In this example, plural PN code generating sections 1021, 1022 and 1023 for generating respective different-series PN codes PS1, PS2 and PS3 are provided. The output of each PN code generating section 1021, 1022 and 1023 is input to the selecting section 1024.

The reproduction prevention control signal FS is supplied to the selecting section 1024 as a selected control signal. The selecting section 1024 selects the contents of control in a reproduction prevention control signal which is a selected control signal out of the plural-series PN codes PS1, PS2 and PS3, that is, a one-series PN code according to the allowance or the prohibition of reproduction and others and outputs it as an SS reproduction prevention control signal.

Figure 16:
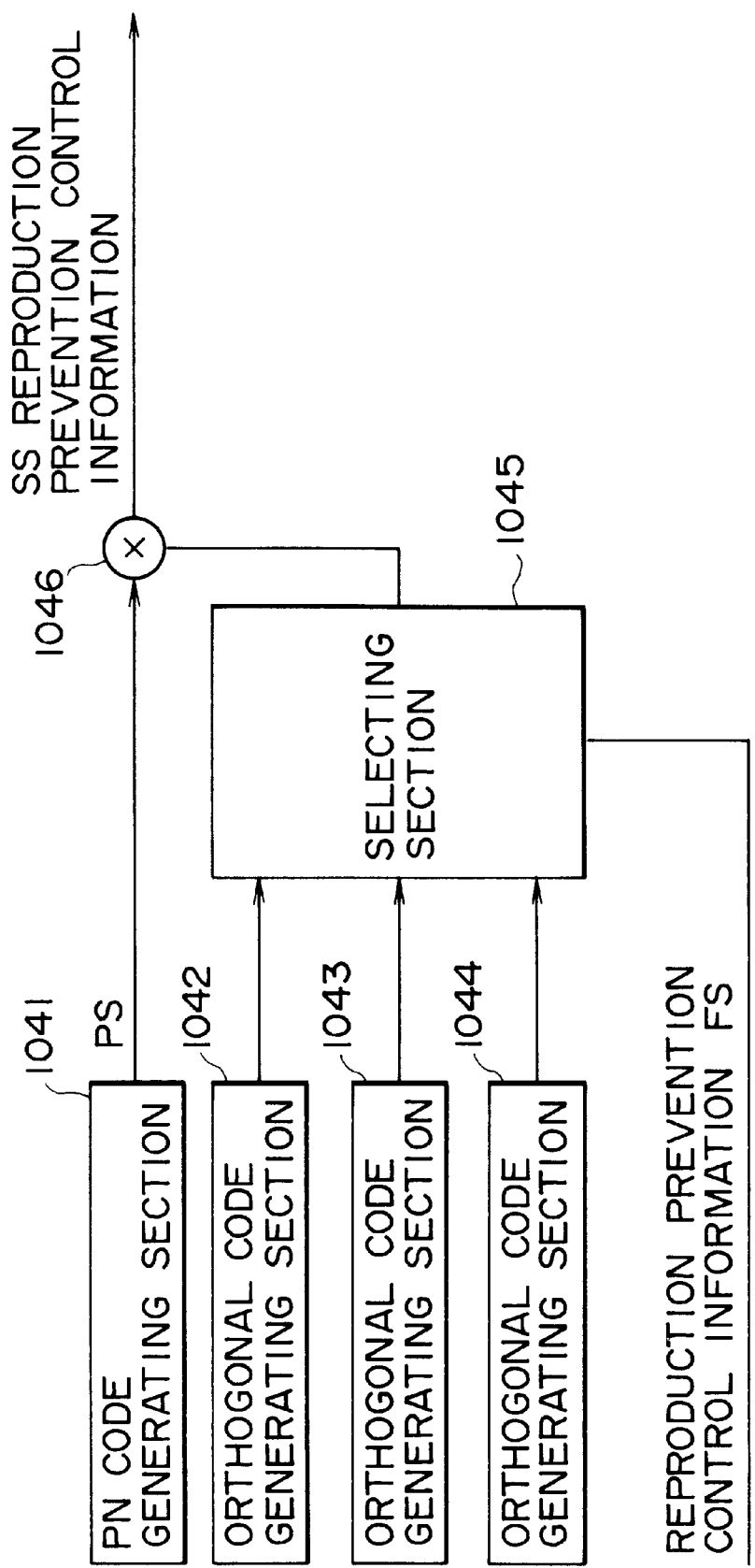
FIG. 16 is a block diagram showing a fourth example of the SS reproduction prevention control signal generating section used for the information output device according to the present invention.

FIG. 16 shows an embodiment of the SS reproduction prevention control signal generating section in case one type of PN code and plural orthogonal codes are used.

In this example, one PN code generating section 1041 and orthogonal code generating sections 1042, 1043 and 1044 for generating orthogonal codes which are different from each other are provided. A PN code PS output from the Pn code generating section 1041 is input to the multiplying section 1046. Different orthogonal codes output from the orthogonal code generating sections 1042, 1043 and 1044 are input to the selecting section 1045. The reproduction prevention control signal FS is also supplied to the selecting section 1045 as a selected control signal.

The selecting section 1045 outputs the contents of control in a reproduction prevention control signal which is a selected control signal out of the plural different orthogonal codes, that is, one orthogonal code according to the allowance or the prohibition of reproduction and others to the multiplying section 1046. In the multiplying section 1046, the PN code PS and the selected orthogonal code are multiplied and the result of the multiplication is output as an SS reproduction prevention control signal.

FIG. 17 shows an embodiment of an SS reproduction prevention control signal detecting section in a recorder for receiving a video signal on which an SS reproduction prevention control signal, in which PN codes of different phases in the example shown in FIG. 14 are used is superimposed.

In the SS reproduction prevention control signal detecting section in this example, a received signal in which an SS reproduction prevention control signal which is converted from analog to digital and changed to the digital signal is superimposed is input to a PN code detecting section 1061. The Pn code detecting section 1061 detects the timing of a PN code and supplies the result of the detection to a reproduction prevention control signal generating section 1062. The reproduction prevention control signal generating section 1062 specifies the contents of control specified by reproduction prevention control information based upon difference in timing among PN codes, generates reproduction control information to be supplied to the reproduction control section according to the specified result and outputs it.

FIG. 18 shows an embodiment of an SS reproduction prevention control signal detecting section in a recorder for receiving a video signal on which an SS reproduction prevention control signal, in which the different-series PN code in the example shown in FIG. 15 or a code generated by combining one type of PN code and plural orthogonal codes respectively in the example shown in FIG. 16 is used, is superimposed.

In the SS reproduction prevention control signal detecting section in this example, a received signal, in which an SS reproduction prevention control signal which is converted from analog to digital and changed to the digital signal is superimposed, is respectively input to PN code detecting sections 1081, 1082 and 1083. Each of the PN code detecting sections 1081, 1082 and 1083 detects a code generated by multiplying a different PN code or one type of PN code and a different orthogonal code. The output is input to the reproduction prevention control information generating section 1084. The reproduction prevention control information generating section 1084 specifies the type of reproduction prevention control information based upon the detected code string, generates reproduction control information to be supplied to a reproduction control section according to the specified result and outputs it.

If the above SS reproduction prevention control signal generating section and the SS reproduction prevention control signal detecting section are used, plural reproduction control information can be also simultaneously added by using PN codes of different phases or a code generated by combining an orthogonal code and a PN code in spreading a spectrum for generating superimposed reproduction control information.

In the above first and second embodiments, a M-series PN code is used, however, a PN code is not limited to this and various spreading codes such as a gold code-series code may be used.

The above examples relate to a case that an information signal is a video signal, however, the present invention can be applied to the reproduction prevention control of an audio signal and any other information request for preventing reproduction which is made.

A case in which reproduction prevention control information is recorded on a recording medium in the form of the digital signal beforehand is described above, however, the present invention can be also applied to an information output device for outputting information by reproducing a recording medium on which analog information is recorded and for which passive reproduction prevention measures according to the above AGC method and APC method are taken.

That is, in that case, the information output device is provided with a reproduction prevention control signal generating section and when a large amplitude of pseudo-synchronizing signal for the above AGC method for example is detected, the information output device generates a reproduction prevention control signal, spreads the spectrum as described above, superimposes the reproduction prevention control signal on an analog output information signal and outputs the signal. Thereby, even if a reproduction prevention control signal is not recorded on a recording medium, reproduction prevention control can be securely executed. Similarly, in an information output device for reproducing information on a recording medium on which information is recorded in the form of the digital signal and direct reproduction prevention control information is not recorded though copyright information as added information is recorded, if a reproduction prevention control signal is generated when the above copyright information as added information is detected in reproduction, the spectrum is spread as described above, the reproduction prevention control signal is superimposed on an analog output information signal and output, reproduction prevention control can be also securely executed in a recorder in the case of analog connection.

As described above, according to the present invention, as the frequency band of a reproduction prevention control signal is spread by spreading the spectrum of the reproduction prevention control signal and the reproduction prevention control signal is superimposed on an analog information signal output from an information output device such as a reproducer for the same time and at the same frequency as the analog information signal, reproduction control information cannot be deleted or corrected by a frequency filter and the simple substitution of an information signal. Therefore, in analog connection, reproduction prevention control can be also effectively executed.

As the spectrum of a reproduction prevention control signal is spread and the reproduction prevention control signal can be superimposed at a low signal level, the reproduction prevention control signal will be less likely to deteriorate an analog information signal.

As in spectral spreading for generating reproduction control information to be superimposed, PN codes of different phases or a code generated by combining an orthogonal code and a PN code are/is used, and plural reproduction control information can be also simultaneously added.

What is claimed is:

1. An information signal reproduction control system for outputting a synthetic information signal in which a reproduction control signal is superimposed on a main information signal and for recording said main information signal on a recording medium according to said reproduction control signal in said synthetic information signal, comprising:

spreading code output means for selectively outputting one of a plurality of predetermined different spectrum spreading codes according to said reproduction control signal and for controlling a prohibition and allowance of recording of said main information signal on said recording medium;

superimposing means for superimposing a selected spectrum spreading code on said main information signal and for generating said synthetic information signal;

spreading code detecting means for detecting said selected spectrum spreading code included in said synthetic information signal from said superimposing means and outputting a detection result signal;

reproduction control signal generating means for receiving said detection result signal from said spreading code detecting means and for generating said reproduction control signal for controlling said prohibition and allowance of recording of said main information signal on said recording medium according to said detection result signal;

recording means for recording said main information signal on said recording medium according to said reproduction control signal, wherein said plurality of predetermined different spectrum spreading codes are provided with different respective phases from one another;

phase spreading code generating means for generating said plurality of predetermined different spectrum spreading codes provided with said different phases from one another; and selecting means for receiving said plurality of predetermined different spectrum spreading codes from said phase spreading code generating means and for selectively outputting one of said plurality of predetermined different spectrum spreading codes according said reproduction control signal.

2. An information signal reproduction control system for outputting a synthetic information signal in which a reproduction control signal is superimposed on a main information signal and for recording said main information signal on a recording medium according to said reproduction control signal in said synthetic information signal, comprising:

spreading code output means for selectively outputting one of a plurality of predetermined different spectrum spreading codes according to said reproduction control signal and for controlling a prohibition and allowance of recording of said main information signal on said recording medium;

superimposing means for superimposing a selected spectrum spreading code on said main information signal and for generating said synthetic information signal;

spreading code detecting means for detecting said selected spectrum spreading code included in said synthetic information signal from said superimposing means and outputting a detection result signal;

reproduction control signal generating means for receiving said detection result signal from said spreading code detecting means and for generating said reproduction control signal for controlling said prohibition and allowance of recording of said main information signal on said recording medium according to said detection result signal;

recording means for recording said main information signal on said recording medium according to said reproduction control signal, wherein said plurality of predetermined different spectrum spreading codes are provided with different respective series from one another;

series spreading code generating means for generating said plurality of predetermined different spectrum spreading codes provided with said different respective series from one another; and selecting means for receiving said plurality of predetermined different spectrum spreading codes from said series spreading code generating means and selectively outputting one of said plurality of predetermined different spectrum spreading codes according said reproduction control signal.

3. An information signal reproduction control system for outputting a synthetic information signal in which a reproduction control signal is superimposed on a main information signal and for recording said main information signal on a recording medium according to said reproduction control signal in said synthetic information signal, comprising:

spreading code output means for selectively outputting one of a plurality of predetermined different spectrum spreading codes according to said reproduction control signal and for controlling a prohibition and allowance of recording of said main information signal on said recording medium;

superimposing means for superimposing a selected spectrum spreading code on said main information signal and for generating said synthetic information signal;

spreading code detecting means for detecting said selected spectrum spreading code included in said synthetic information signal from said superimposing means and outputting a detection result signal;

reproduction control signal generating means for receiving said detection result signal from said spreading code detecting means and for generating said reproduction control signal for controlling said prohibition and allowance of recording of said main information signal on said recording medium according to said detection result signal;

recording means for recording said main information signal on said recording medium according to said reproduction control signal, wherein said plurality of predetermined different spectrum spreading codes are generated by multiplying a specific code and a plurality of different orthogonal codes;

specific spreading code generating means for generating said specific spreading code;

orthogonal code generating means for generating said plurality of different orthogonal codes;

selecting means for receiving said plurality of different orthogonal codes from said orthogonal code generating means and for selectively outputting one of said plurality of different orthogonal codes according to said reproduction control signal; and multiplying means for multiplying one of said plurality of different orthogonal codes from said selecting means and said specific spreading code from said specific spreading code generating means.

* * * * *